Figure 1:
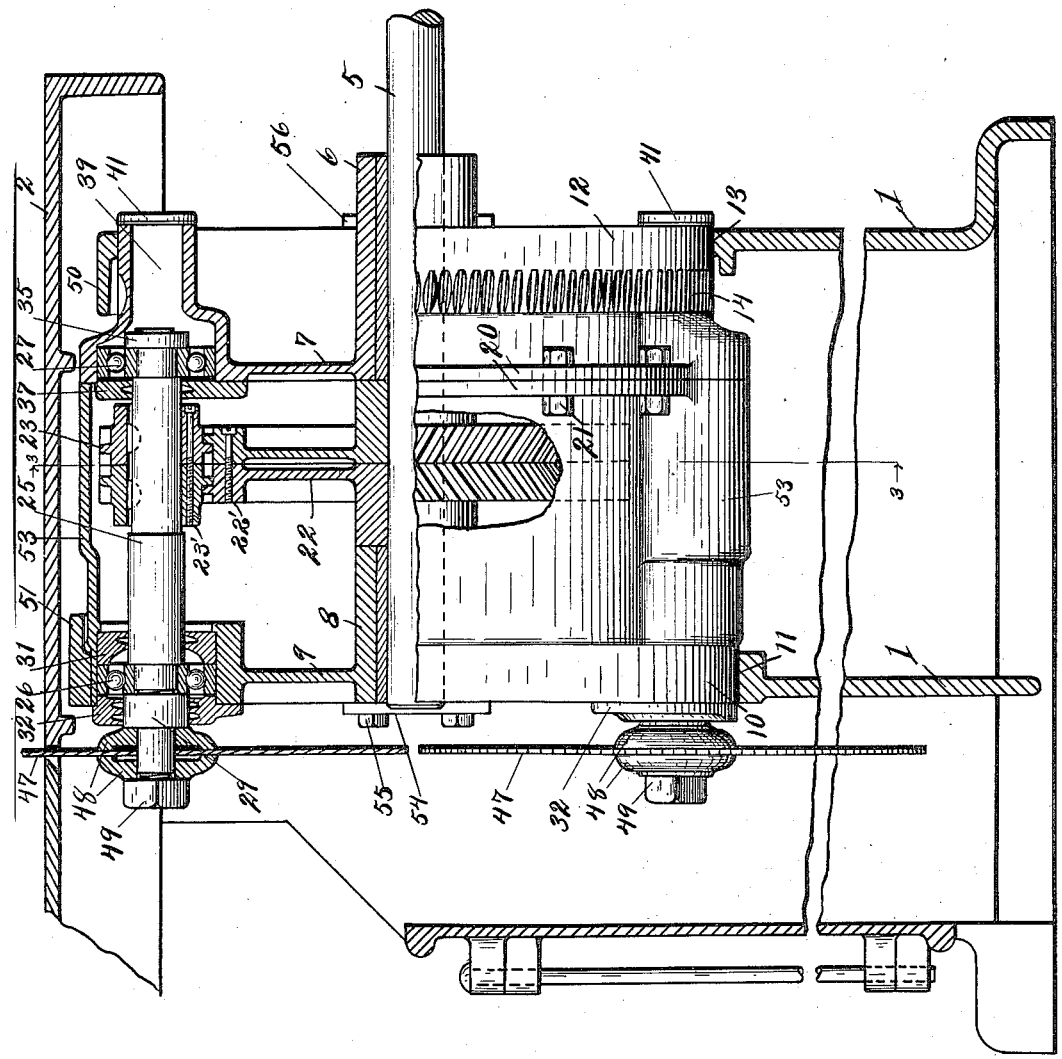

W. R. FOX & E. W. CLEVELAND.
SAW BENCH STRUCTURE.
APPLICATION FILED AUG. 26, 1912.
1,139,659.
Patented May 18, 1915.
4 SHEETS—SHEET 1.
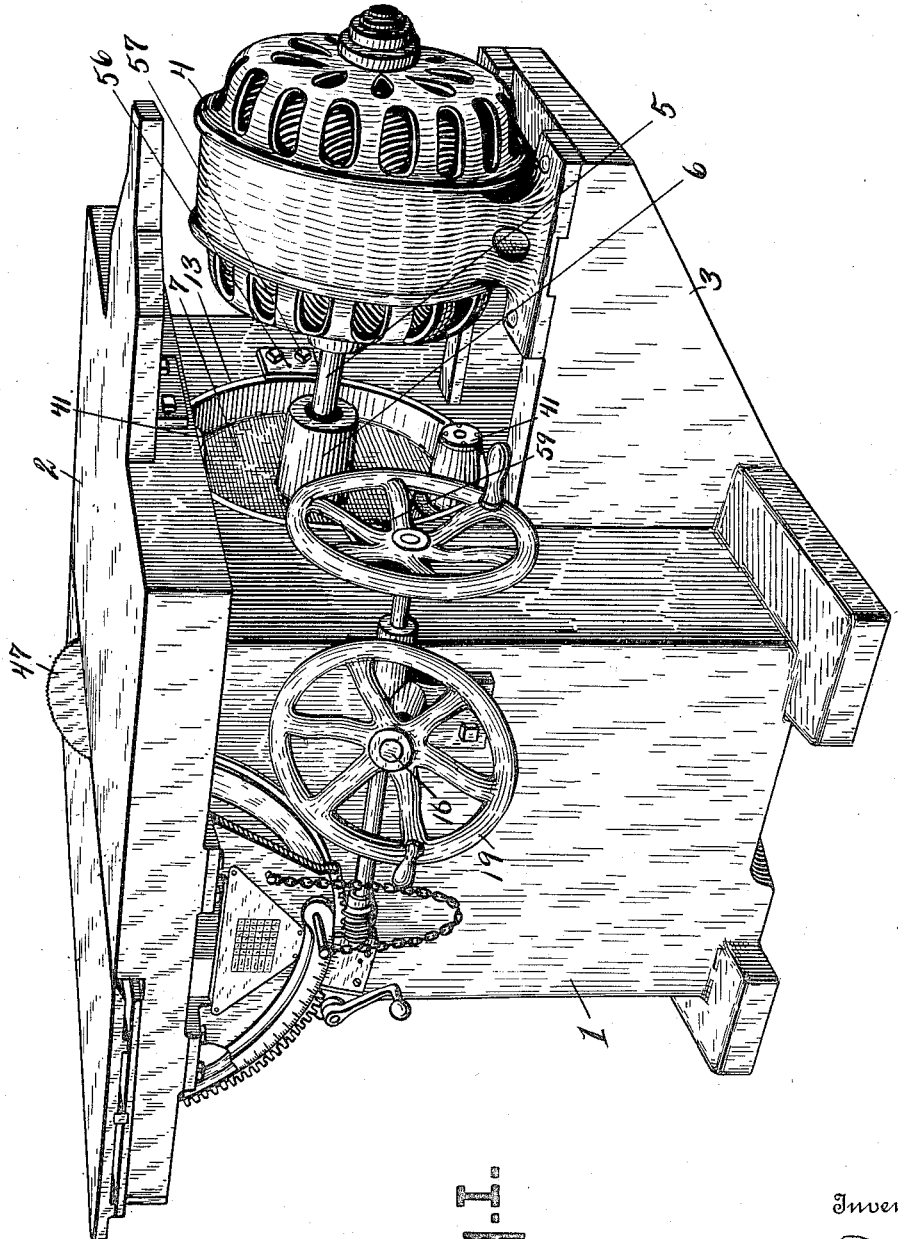

W. R. FOX & E. W. CLEVELAND.
SAW BENCH STRUCTURE.
APPLICATION FILED AUG. 26, 1912.

1,139,659.

Patented May 18, 1915.
4 SHEETS—SHEET 2.

Witnesses
M. J. Woodruff
Pearl E. Lillie

Inventor
William R. Fox
and Edgar W. Cleveland
By Chappell & Earl
Attorneys

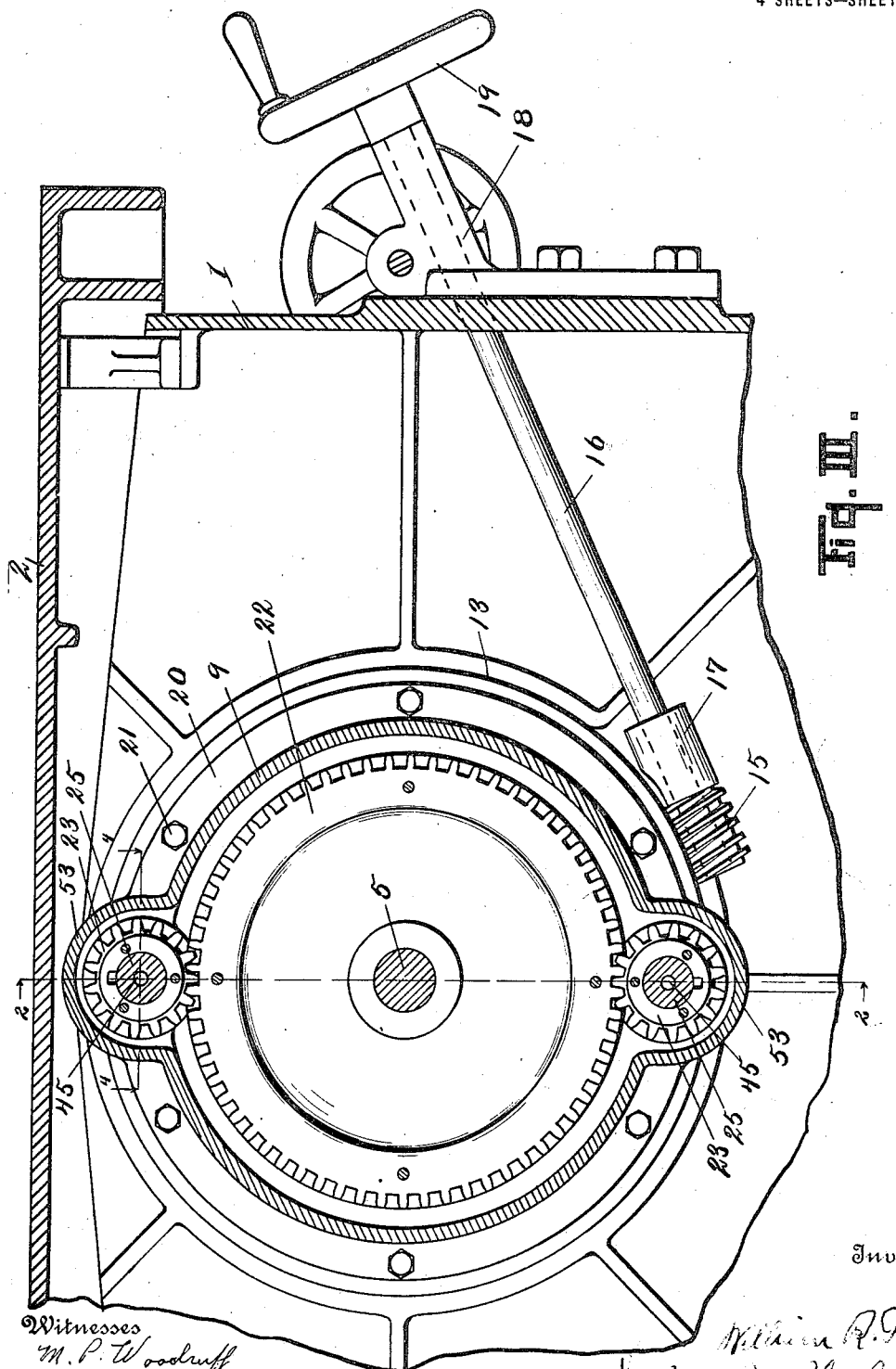

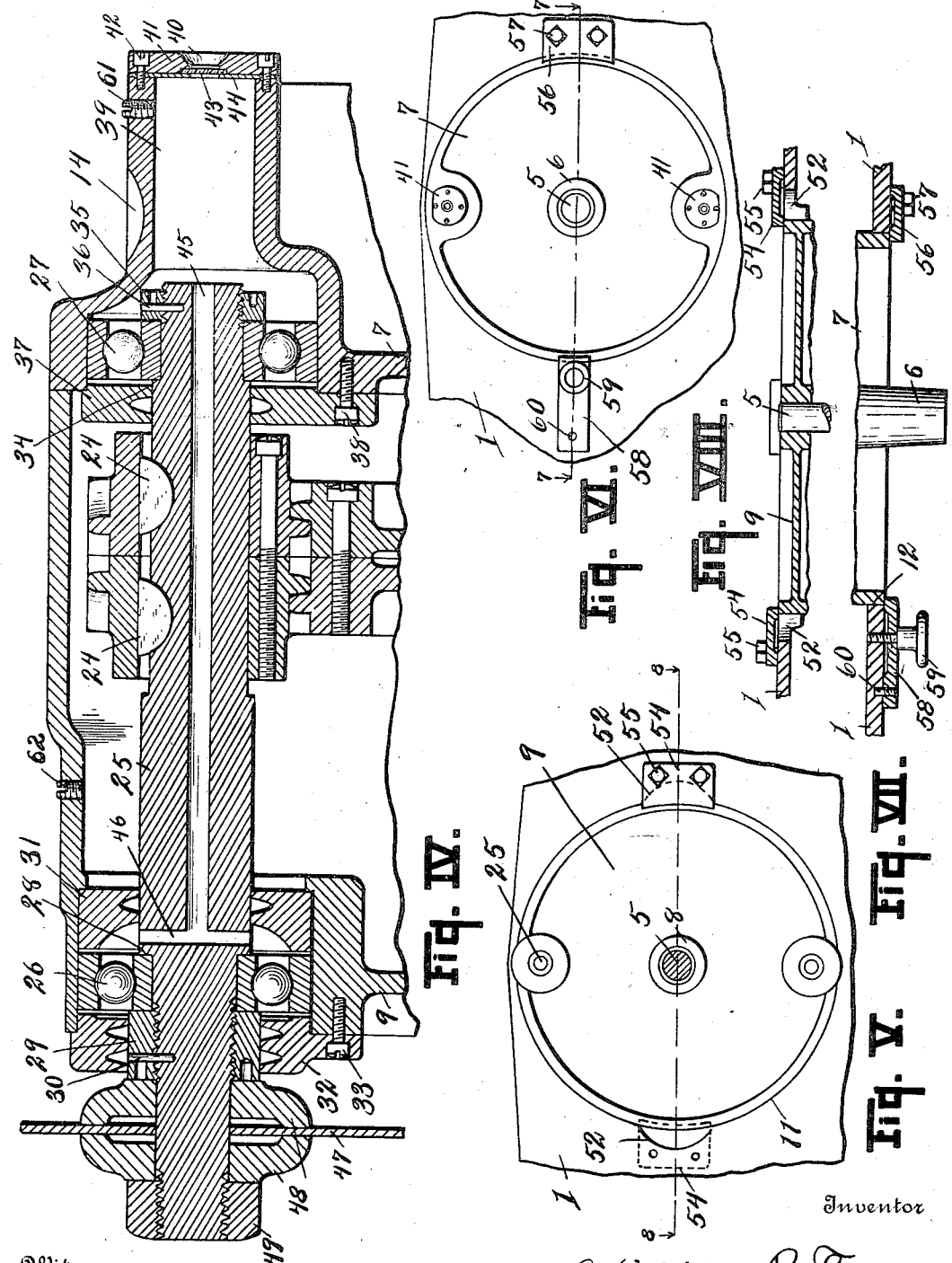

UNITED STATES PATENT OFFICE.

WILLIAM R. FOX AND EDGAR W. CLEVELAND, OF GRAND RAPIDS, MICHIGAN; SAID CLEVELAND ASSIGNOR TO SAID FOX.

SAW-BENCH STRUCTURE.

1,139,659.   Specification of Letters Patent.   Patented May 18, 1915.

Application filed August 26, 1912. Serial No. 717,124.

*To all whom it may concern:*

Be it known that we, WILLIAM R. Fox and EDGAR W. CLEVELAND, citizens of the United States, residing at Grand Rapids, Michigan, have invented certain new and useful Improvements in Saw-Bench Structures, of which the following is a specification.

This invention relates to improvements in circular saw driving means especially adapted to direct electric motor drive.

The invention relates particularly to such saws having a plurality of arbors yoked together and suitably supported in a frame so that the different saws may be successively brought into the working position as desired by suitable adjustment.

The objects of the invention are: First, to provide an improved construction adapted to be electrically driven. Second, to provide improved gear connections for driving a plurality of arbors arranged and disposed for effective lubrication. Third, to provide an improved yoke drum and means for supporting the same in a saw frame or bench, which can be readily assembled. Fourth, to provide improved adjusting means for shifting the yoke drum to bring the different saws in the yoke to working position. Fifth, to provide improved means for locking the arbor carrying drum at any desired position.

Further objects and objects relating to details and economies of construction and operation will definitely appear from the detailed description to follow.

We accomplish the objects of our invention by the mechanism described in the following specification.

The invention is clearly defined and pointed out in the claim.

A structure constituting a preferred embodiment of our invention is clearly illustrated in the accompanying drawing, forming a part of this specification, in which:

Figure I is a perspective view of a saw table and circular saw, with our improved electrically driven saws in position. Fig. II is a longitudinal vertical detail sectional view, portions being shown in full line, somewhat enlarged of the structure appearing in Fig. I, the same being taken on a line corresponding to line 2—2 of Fig. III. Fig. III is a detail transverse sectional elevation taken on a line corresponding to line 3—3 of Fig. II, looking toward the right of the figure. Fig. IV is an enlarged detail longitudinal sectional view, through one of the saw arbors when in the upper position, taken on a line corresponding to line 4—4 of Fig. III. Fig. V is a detail end elevation view of the end of the yoke carrying drum in place, from the left end of Fig. II, showing the clamp means which secures the same, one clamp being removed. Fig. VI is a detail end elevation view from the right hand end of Figs. I and II, showing details of construction of the removable drum and the clamp for retaining the same in place. Fig. VII is an enlarged detail sectional view taken on a line corresponding to line 7—7 of Fig. VI, showing details of construction of the clamp means at that end. Fig. VIII is an enlarged detail sectional view taken on a line corresponding to line 8—8 of Fig. V, showing the details of construction at that end of the removable drum.

In the drawings the sectional views are taken looking in the direction of the little arrows at the ends of the section lines and similar numerals of reference refer to similar parts throughout the several views.

Considering the numbered parts of the drawing, the saw frame is made up of the main frame or casting 1, on which is disposed any suitable saw table 2, an adjustable and tilting table being preferred.

A shelf 3 is disposed at one end of the main frame 1 and carries an electric motor 4, which is connected to drive the shaft 5 by direct connection. The shaft 5 is supported in bearings 6 and 8, which are centrally disposed in the end walls 7 and 9, respectively, of the adjustable yoke drum. This yoke drum is cylindrical at each end, being made up of two end parts 10 and 12, suitably joined together by flanges 20 through which are disposed the bolts 21. These ends 10 and 12 are cylinders machined to true at the ends and fit in circular bearings 11 and 13, respectively, in the main casing, as clearly appears in Fig. II.

The end 12 of the drum is provided with worm gear 14, with which meshes a worm 15 carried by shaft 16, which shaft is supported in bearings 17 and 18, and is controlled by a hand wheel 19 at a convenient point at the side of the bench. By this means it will be observed that the drum can be readily turned over by manipulating the hand wheel 19 and is securely supported at all times.

A helical or herring-bone gear 22 is disposed on the shaft 5. This is formed of symmetrical halves suitably bolted together by bolts or screws 22', (see Fig. II). This gear meshes with a small gear or pinion 23 made up of symmetrical halves secured together by bolts 23'.

A pair of saw arbors 25 are provided, and as these arbors and their associated parts are the same we will describe only one of them. The gear 23 is secured by keys 24—24 in suitable keyways in the arbor 25, whereby the gears 23 are free to move longitudinally to a slight extent upon the said arbor 25.

The arbor 25 is supported on suitable ball bearings 26—27 at each end, the outer of the races of each of which is slightly movable longitudinally in its support to permit adjustment of the said arbor, suitable recesses being formed in the ends 7 and 9 of the yoke carrying drum for this purpose. The saw end of the arbor is shouldered at 28 to receive the inner ball race at that end, which is clamped in place by the threaded collar 29 which is locked in place by the locking pin 30. The outer end of this collar is faced and against it are clamped the saw flanges 48 by the nut 49 at the outer end of the arbor, the saw 47 being clamped between the flanges. A retaining plate 32, journaled on the collar 29, is retained in position on the yoke by cap screws 33, oil retaining grooves being provided in the journal of this part. The opposite end of the arbor is supported on ball bearings 27, as indicated. The outer ball race is movable in its support and the inner ball race is clamped to the shoulder 34 of the arbor by the nut 35, which is locked in place by the pin 36. A plate 37, retained in place by the screw 38, is journaled on the arbor 25 and assists in guiding and supporting the same. An oil chamber 39 is beyond the end of the arbor 25, in a projecting part of the yoke, which is provided with a cap plate 41 with a window 40 covered by suitable glass 43, to permit inspection so that the opertaor can know that there is a supply of oil at all times. A gland 44 is under the cap to insure a tight fit, the cap 41 being retained in place by set screws 42. A center oil hole 45 is formed longitudinally of the arbor with cross openings 46 for delivering oil to lubricate ball bearings at the front end of the arbor.

The upper portions of the main frame 1 are made as light as possible, and are broadened or widened into supporting rims 50 and 51 above the adjustable drum, to permit the drum to come as near the top of the table as possible, the casting being made more firm by these additional flanges or extensions.

The yoke carrying drums are removable, owing to the fact that the bearing ring 11 is larger than the bearing ring 13. The sides of the drum are enlarged slightly at 53—53 to accommodate the pinions 23 on the saw arbors, and the sides of the frame 1 are cut away at 52—52 in substantially semicircular form to permit the yoke supporting drum to be inserted. Caps 41 are slightly dressed down so that they insert into the bearings 13 without contact and revolve freely under the edges of their clamps 56 and 58. Projecting plates 54—54 are secured in place at the left hand end of the frame by cap screws 55—55 and cover the apertures 52 and retain the drum in place. See Figs. V and VIII. A plate 56 is secured in place by the cap screw 57 at the opposite end. See Figs. VI and VII.

A clamp 58 is provided for locking the drum against rotation after the same has been adjusted. This clamp is pivoted by the pin 60 and is forced into place by the hand screw 59 which is screw threaded into a hole in the side of the casting 1.

The bearings for the arbors will be observed to be oil tight, and we have provided an oil plug 61, (see Fig. IV) for introducing oil into the same. Also, the yoke drum is oil tight, and we fill a quantity of oil into the same so that the herring-bone gears 22 will run in oil and consequently run substantially without wear and noiselessly. An oil plug 62, (see Fig. IV) permits the introduction of oil into the drum.

We desire to say that while we have provided herring-bone gears for driving the arbors, it will be found that straight spur gears will be quite effective, especially when they are run in oil, but the herring-bone gear is so much better that we have shown it as our preferred construction. This arrangement and construction permits the use of direct connected electric motor drive. However, the saw structure and driving means could be driven by a belt and pulley, but as this means is so simple and well known, we have not deemed it necessary to illustrate it.

Many modifications of details will be readily devised by those skilled in the art to which this invention pertains, without departing from the principles thereof. The drum can be variously supported, and might be fitted in to the circular bearing at one end only.

We desire to claim the invention specifically as illustrated, and also to claim the same broadly as pointed out in the appended claim.

Having thus described our invention, what we claim as new and desire to secure by Letters Patent is:

In a saw bench structure, the combination of a frame, bearing apertures in said frame, a drum journaled in said bearing apertures, said drum being adapted to retain oil, a plurality of saw arbors journaled in said drum, means for rotating said drum, means for retaining said drum in position in said bearing apertures, a central shaft in the axis of said drum, means for driving said shaft, a gear on said shaft within the said drum, and a pinion provided on each of said saw arbors meshing with said gear, all coacting substantially as described for the purpose specified.

In witness whereof, we have hereunto set our hands and seals in the presence of two witnesses.

WILLIAM R. FOX. [L. S.]
EDGAR W. CLEVELAND. [L. S.]

Witnesses:
LENA D. CHURCH,
CLAIRE L. CANFIELD.